United States Patent

[11] 3,553,510

| [72] | Inventor | Kenneth Clayton Howey<br>Birmingham, England |
| --- | --- | --- |
| [21] | Appl. No. | 743,183 |
| [22] | Filed | July 8, 1968 |
| [45] | Patented | Jan. 5, 1971 |
| [73] | Assignee | Joseph Lucas (Industries) Limited<br>Birmingham, England<br>a British company |
| [32] | Priority | July 7, 1967 |
| [33] | | Great Britain |
| [31] | | No. 31445/67 |

[54] ROTOR FOR PERMANENT MAGNET ALTERNATOR
9 Claims, 4 Drawing Figs.
[52] U.S. Cl............................................. 310/156,
310/44, 310/263, 310/271
[51] Int. Cl........................................ H02k 21/12
[50] Field of Search........................... 310/156,
263, 162, 160, 44, 168, 153, 271

[56] References Cited
UNITED STATES PATENTS

| 2,134,795 | 11/1938 | Myers | 310/44 |
| --- | --- | --- | --- |
| 3,088,044 | 4/1963 | Goss | 310/162 |
| 3,230,405 | 1/1966 | Sorensen | 310/263 |
| 3,271,606 | 9/1966 | Collins | 310/263 |
| 3,305,740 | 2/1967 | Shano | 310/263 |

FOREIGN PATENTS

| 17,210 | 12/1899 | Great Britain | 310/153 |
| --- | --- | --- | --- |

Primary Examiner—Milton O. Hirshfield
Assistant Examiner—R. Skudy
Attorney—Holman, Glascock, Downing & Seebold ABSTRACT: A rotor for a permanent magnet alternator includes a pair of spaced magnetic claws, the claws having interdigitated fingers. A ferrite or other sintered magnet is supported between the claws with the fingers of the claws overlying the periphery of the magnet, and the magnet is formed in at least two parts which can move radially relative to the claws. A nonmagnetic band engages the periphery of the magnet to limit movement of the parts of the magnet.

PATENTED JAN 5 1971

INVENTOR
KENNETH CLAYTON HOWEY
BY Glascock, Downing &
Seebold
ATTORNEYS

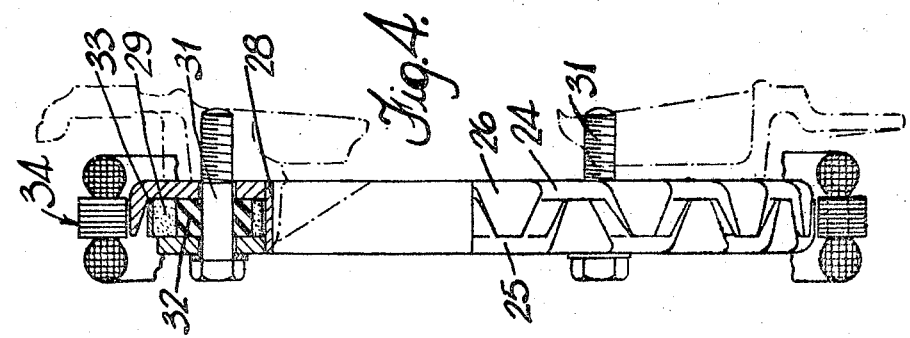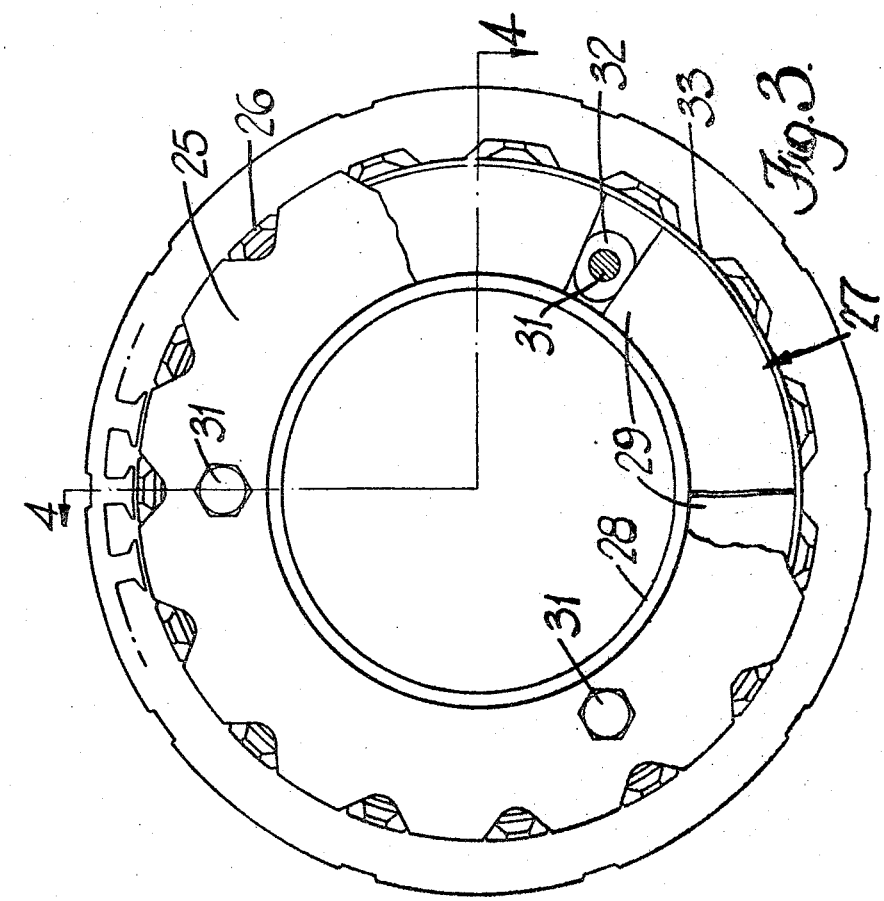

ROTOR FOR PERMANENT MAGNET ALTERNATOR

This invention relates to rotors for permanent magnet alternators.

A rotor according to the invention comprises a pair of spaced magnetic claws, the claws having interdigitated fingers, a ferrite or other sintered magnet supported between the claws with the fingers overlaying the periphery of the magnet, the magnet being formed in at least two parts which can move radially relative to the claws, and the rotor further including a nonmagnetic band engaging the periphery of the magnet.

In the accompanying drawing:

FIG. 3 is a plan view of a rotor in accordance with a second example of the invention; and FIG. 4 is a sectional view on the line 4-4 in FIG. 3.

Figure 1:
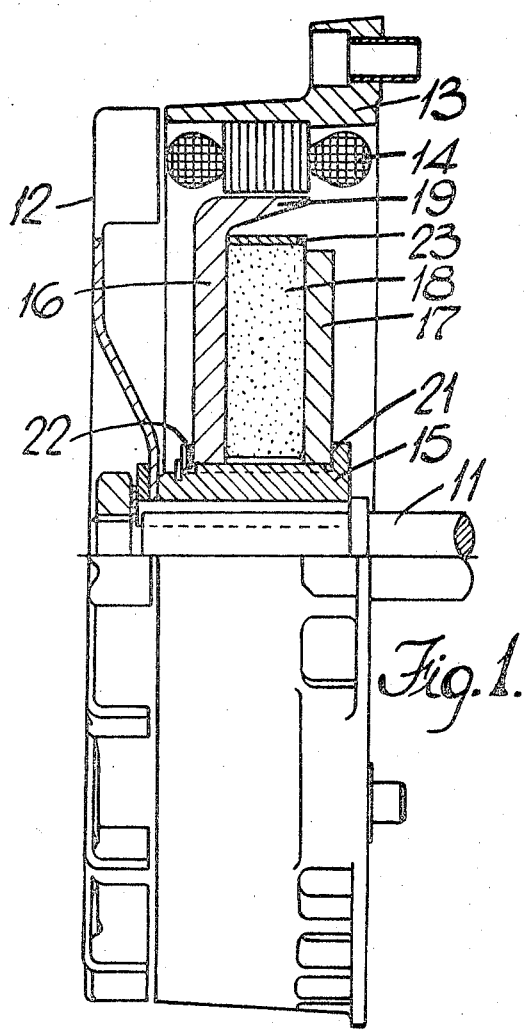
FIG. 1 is a part sectional side view illustrating part of a permanent magnet alternator utilizing a rotor in accordance with one example of the invention.

Referring first to FIG. 1, a permanent magnet alternator includes a rotor shaft 11 carrying a fan 12, and a stator assembly 13 carrying windings 14.

The rotor includes a nonmagnetic sleeve 15 which has a splined engagement with the shaft 11. Keyed to the sleeve are a pair of spaced disclike magnetic claws 16, 17 between which is mounted a ferrite magnet 18. The claws 16, 17 are formed with interdigitated fingers 19 overlaying the periphery of the magnet 18, and the claws and magnet are held on the shaft in engagement with a shoulder 21 at one end thereof by a spring washer 22.

Figure 2:
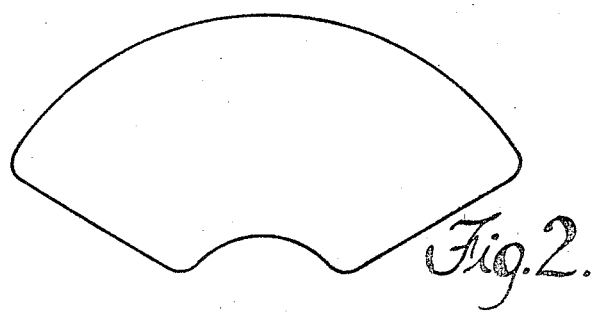
FIG. 2 illustrates part of the ferrite magnet used in the rotor.

The ferrite magnet 18 is formed in three segmental parts one of which is shown in FIG. 2. Engaged with the periphery of these parts is a split aluminum or other nonmagnetic band 23.

The arrangement is such that when the rotor is rotated, the three parts of the ferrite magnet will move outwardly by a short distance, thereby expanding the band 23, but will be retained in position by the fingers 19 acting through the band 23. If a solid ferrite magnet 18 is employed, there is a serious danger of the stresses resulting from rotation bursting the magnet, but this problem is avoided by making the magnet in a number of parts which can move outwardly. The band 23 ensures that the fingers 19 accept the load evenly, and so not bite into the edge of the periphery of the magnet 18.

The invention can also be applied to an arrangement in which the rotor assembly includes two or more ferrite magnets in side-by-side relationship.

The rotor illustrated in FIGS. 3 and 4 is adapted to be connected to the flywheel of an engine, and includes a pair of annular claws 24, 25 similar to the claws 16, 17. The claws 24, 25 are formed with interdigitated fingers 26 which overlay the periphery of magnet 27, and the claws 24, 25 are mounted as an interference fit on a knurled, nonmagnetic sleeve 28. The magnet 27 is formed in six segmental parts 29 which are arranged in three equiangularly spaced pairs. The claw assembly is secured to the flywheel of the engine (shown in chain-dotted lines in FIG. 4) by three nonmagnetic bolts 31 which extend through the claws 24, 25 between adjacent pairs of magnet parts 29. Between the adjacent pairs of magnet parts 29 and the bolts 31 pass through rubber bushes 32 which are compressed when the rotor is assembled so as to take up circumferential tolerances between the magnet parts 29 and the bolts 31. The bushes 32 also prevent fretting of the magnet parts 29 by the bolts 31. A split, aluminum or other nonmagnetic band 33 engages the periphery of the parts 29 and acts in the manner of the band 23 in the first example, to limit the outward radial movement of the magnet parts 29. A stator assembly 34, similar to the stator assembly 13 in the first example surrounds the rotor.

I claim:

1. A rotor for a permanent magnet alternator comprising, a pair of spaced magnetic claws, the claws having interdigitated fingers, a sintered magnet supported between the claws with the fingers overlaying the periphery of the magnet, the magnet being formed of at least two parts which may move radially relative to the claws, and the rotor further including a nonmagnetic band engaging the periphery of said magnetic parts to limit the radial movement of said magnetic parts.

2. A rotor as claimed in claim 1 wherein said band is split to permit expansion of the band as the parts of the magnet move radially outwardly.

3. A rotor as claimed in claim 1 wherein said band if formed from aluminum.

4. A rotor as claimed in claim 1 wherein said claws are annular and are interconnected by a nonmagnetic member which extends through the central holes in said claws.

5. A rotor is claimed in claim 4 wherein said nonmagnetic member is in the form of a sleeve and the rotor includes a rotor shaft which extends through said sleeve, said sleeve being nonrotatably mounted on said shaft and said shaft serving to mount the rotor for rotation about the axis of the shaft.

6. A rotor as claimed in claim 5 wherein said shaft carries a fan.

7. A rotor as claimed in claim further including means whereby the rotor can be mounted on the flywheel of an engine for rotation therewith.

8. A rotor as claimed in claim 7 therein said means includes at least one nonmagnetic bolt which extends through said rotor into engagement with the flywheel.

9. A rotor as claimed in claim 8 wherein said bolt passes through a rubber bush interposed between adjacent magnet parts.